No. 883,467. PATENTED MAR. 31, 1908.
G. D. MITCHELL.
WATER PURIFYING SYSTEM FOR SWIMMING TANKS.
APPLICATION FILED MAR. 10, 1905.
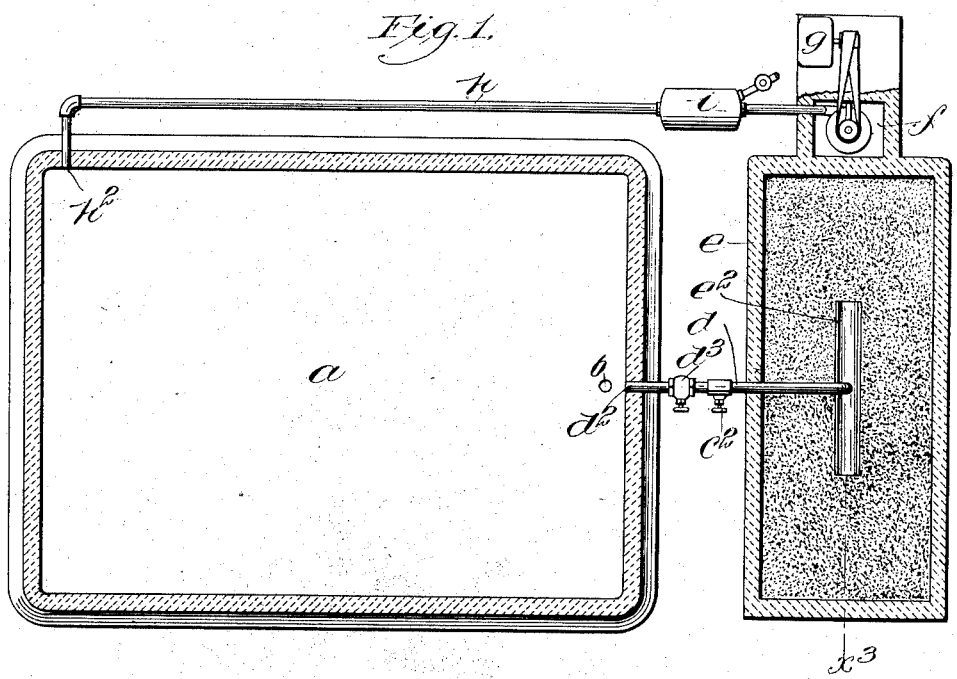
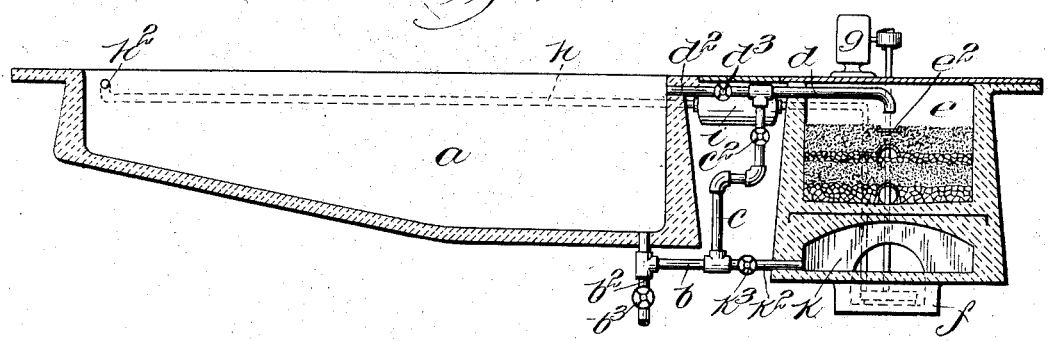
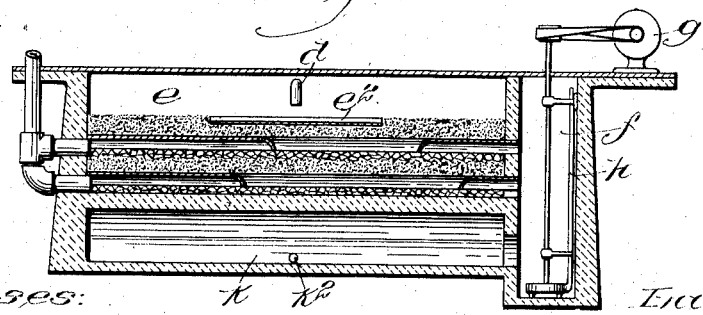

UNITED STATES PATENT OFFICE.

GARRYT D. MITCHELL, OF CHELSEA, MASSACHUSETTS, ASSIGNOR TO THE SWIMMING POOL FILTRATION COMPANY, A CORPORATION OF MASSACHUSETTS.

WATER-PURIFYING SYSTEM FOR SWIMMING-TANKS.

No. 883,467.  Specification of Letters Patent.  Patented March 31, 1908.

Application filed March 10, 1905. Serial No. 249,355.

*To all whom it may concern:*

Be it known that I, GARRYT D. MITCHELL, a citizen of the United States, residing in Chelsea, in the county of Suffolk and State of Massachusetts, have invented an Improvement in Water-Purifying Systems for Swimming-Tanks, of which the following description, in connection with the accompanying drawings, is a specification, like letters on the drawings representing like parts.

The present invention relates to a water purifying system for swimming tanks, the purpose of the invention being to connect a swimming tank with means for purifying the water, such as a filtering bed, so that the water can be circulated through the purifying means from time to time, the same water thus being repeatedly used, and being at all times clean and pure. This results not only in a saving of the water used, but also in a saving of heat when the water is heated, since, in circulating the water, instead of replacing it, a considerable portion of the heat is retained.

As a secondary feature of the invention, I provide the circulating pipes with a heating appliance, it being practicable, therefore, for heating purposes, to circulate the water past the heating appliance, without passing the same through the filter, when it is desired to heat the water without filtering it.

Figure 1 is a horizontal section through a swimming tank and filter taken at the normal level of the water in the tank; Fig. 2 is a vertical section through the middle of Fig. 1 and Fig. 3 is a vertical section on a plane transverse to that of Fig. 2, on the line $x^3$ of Fig. 1, looking towards the left.

The swimming tank $a$ is provided with an outlet pipe $b$ at or near the bottom of the tank, which communicates through a pipe $c$ with a pipe $d$ leading to the purifying means, and is herein shown as opening over a suitable filter bed $e$. The filter bed may be of any suitable kind, but is herein shown as having the characteristics of the filter bed set forth in Patent No. 732,208, granted to me June 30, 1903.

The water is discharged upon the top of the filter bed, and falls into a trough $e^2$, the purpose of which is to protect the upper layer of the filter, which is of comparatively fine material, such as sand, which would be washed away if the stream of water fell directly on it. The water, after passing through the filter, accumulates in a well $f$, and circulation is maintained by means of a pump of any suitable kind, herein shown as a centrifugal pump driven by a motor $g$, the water from the pump being drawn through a pipe $h$ which opens at $h^2$ into the tank near the top thereof. The level of the water is thus maintained just above the pipe $d$ so that the water will flow out by gravity into the filter. As herein shown, the pipe $d$ is provided with a branch $d^2$ leading from the tank just below the water level thereof, the said pipe being controlled by a valve $d^3$ so that by opening said valve, the surface water will flow directly through the pipes $d^2$ and $d$ to the filter, the purpose being to carry off any scum or foreign substance which may be floating on the top of the tank.

The apparatus may be provided with a heater $i$ so positioned as to influence the circulating water, the said heater being herein shown as surrounding the pipe $h$ so as to heat the water on its way to the tank.

The apparatus may be further provided with a reservoir $k$ which receives the water from the filter, the said reservoir, being of sufficient capacity to insure a plentiful supply of pure water at all times, so that the contents of the tank can be drawn off and pure water supplied in its place without waiting for the water to percolate through the filter. If it is desirable to circulate the water for heating purposes only, without passing the same through the filter, the reservoir $k$ may be directly connected with the pipe $b$ through a pipe $k^2$ controlled by a valve $k^3$. In this case, the valves $d^3$ and $c^2$ in the pipe $c$ are closed, and the water circulates directly through the pipe $b$, reservoir $k$ and pipe $h$, while, however, the reservoir performs a useful function, it may obviously be dispensed with, and the water circulated directly past the heating appliance, or through the filter. The pipe $b$ is shown as provided with a branch $b^2$ controlled by a valve $b^3$ for the purpose of drawing off the contents of the tank, if desired, in order to empty the same for cleaning, or other purposes.

Claims.

1. The combination with a swimming tank; of a filter adjacent thereto; a pipe leading from the bottom of the tank and having an outlet above the top of the filter; a pipe leading from a point below the filter to the top of the tank; a pump to convey filtered water to the tank through said pipe; a heating device adjacent to said pipe; a by-pass between the bottom of the tank and the pipe which leads from below the filter; and means for controlling the pipes whereby water can be circulated and heated without being passed through the filter.

2. The combination with a swimming tank; of a filter bed; a reservoir below said filter bed; a pipe leading from the bottom of the tank directly to said reservoir and provided with a valve; a pipe leading from the bottom of the tank to the top of the tank and provided with a valve; and a pipe leading from the reservoir to the top of the tank, substantially as described.

In testimony whereof, I have signed my name to this specification in the presence of two subscribing witnesses.

GARRYT D. MITCHELL.

Witnesses:
MARGARET H. COVENEY,
HENRY J. LIVERMORE.